United States Patent [19]

Ferraroni

[11] Patent Number: 5,204,750
[45] Date of Patent: Apr. 20, 1993

[54] SECTIONAL FRAME FOR FORMING SHEILDING UNITS FOR THE RADIATION EMITTED BY APPARATUS INCORPORATING VARIOUSLY SIZED VIDEO TERMINALS

[75] Inventor: Silvano Ferraroni, Reggio Emilia, Italy

[73] Assignee: Mas-Plast S.r.l., Reggio Emilia, Italy

[21] Appl. No.: 765,205

[22] Filed: Sep. 25, 1991

[30] Foreign Application Priority Data

Oct. 3, 1990 [IT] Italy .................................. 34851 B/90

[51] Int. Cl.⁵ ............................................. H04N 5/65
[52] U.S. Cl. ..................................... 358/247; 358/245; 358/252; 358/253; 359/601; 359/609; 313/479
[58] Field of Search ................. 358/245, 247, 252, 253; 359/601, 609; 313/112, 466, 474, 478, 479

[56] References Cited

U.S. PATENT DOCUMENTS

| | | | |
|---|---|---|---|
| 4,577,928 | 3/1986 | Brown | 358/252 |
| 4,745,518 | 5/1988 | Fang | 358/252 |
| 4,834,330 | 5/1989 | Swillinger | 358/252 |
| 4,905,089 | 2/1990 | Liang et al. | 358/247 |

FOREIGN PATENT DOCUMENTS

| | | |
|---|---|---|
| 0331349 | 9/1989 | European Pat. Off. |
| 0385037 | 5/1990 | European Pat. Off. |
| 299116 | 11/1928 | United Kingdom |

*Primary Examiner*—Edward L. Coles, Sr.
*Assistant Examiner*—Jill Jackson

[57] ABSTRACT

A frame for assembling shielding units for the radiation emitted by apparatus incorporating variously sized video terminals comprises two flat annular structures, namely a front and a rear, which are able to be connected together to simultaneously clamp the perimetral edge of a shielding plate (2), the annular structures each consisting of four identically configured consecutive elements (1), each comprising one corner (11) and one side (10) of the peripheral form of the corresponding flat annular structure, the elements (1) of the front or near flat annular structure overlying the abutting end regions of the pairs of elements pertaining to the rear or front flat annular structure.

5 Claims, 3 Drawing Sheets

SECTIONAL FRAME FOR FORMING SHEILDING UNITS FOR THE RADIATION EMITTED BY APPARATUS INCORPORATING VARIOUSLY SIZED VIDEO TERMINALS

BACKGROUND OF THE INVENTION

This invention relates to a sectional frame for forming variously sized shielding units for filtering the radiation emitted by apparatus incorporating video terminals.

The use of apparatus provided with visual display units or video terminals is known to be continuously increasing in the most diverse industrial sectors.

It is also known that during operation, such terminals emit radiation and suffer from variable or pulsating brightness, which besides bothering the operator can inflict irreversible damage in the long term.

To at least partly remedy the aforesaid problems, shielding devices have been proposed comprising a stratified glass plate to be placed in front of the screen of said visual display units or video terminals, in order to filter said radiation and/or attenuate said brightness variations.

Two examples of said known devices are well illustrated and described in Italian model applications Nos. 34876 B/89 and 34825 B/90, to which reference should be made for further details.

Basically, the known devices of the cited documents comprise a flat structure to be removably fixed to the upper face of the housing of a visual display unit or video terminal, to support a frame containing a shielding plate performing the aforesaid function.

Specifically, said frame comprises two flat annular elements, namely a front and a rear, which can be snap-fitted together to simultaneously clamp and centre the shielding plate.

Said flat annular elements are produced by moulding a convenient synthetic material, and each consists of a one-piece structure, the inner dimensions of which conform to the outer dimensions of the screen with which the shielding plate is to be associated.

However, commercially available visual display units or video terminals comprise a wide range of standard screen sizes, with the result that different frames must be available in a number equal to the number of different screen sizes.

This is particularly inconvenient for the frame manufacturer, considering that starting from a frame (for example a square frame) with inner dimensions of for example 25×25 inches and terminating with a frame (for example a square frame) with inner dimensions of for example 10×10 inches, it may be necessary to provide the whole range of frames decreasing in one inch steps (both in height and width) from the largest downwards.

In addition, rectangular frames may be required, with their major axis lying horizontally or vertically.

It is immediately apparent that such a production range involves problems of study/design, manufacture (such as the preparation of costly moulds correspondingly equipped and sized), packaging/storing and distribution/advertising.

SUMMARY OF THE INVENTION

The main object of the present invention is to obviate the aforesaid within the context of a simple and rational design.

According to the invention, the proposed frame is of the type comprising two flat annular structures, namely a front and a rear, which are able to be connected together to simultaneously clamp the outer edge of a shielding plate, said annular structures each consisting of four identically configured consecutive elements, each comprising one corner and one side of the peripheral form of the corresponding flat annular structure. Said four consecutive elements preferably have the same initial length for the reasons which will be apparent hereinafter, the consistency of the frame according to the invention being ensured by the fact the abutting end regions between the pairs of consecutive elements pertaining to one annular structure (the front or rear structure) are covered by a continuous portion of the elements pertaining to the opposing conjugate annular structure (the rear or front structure).

The objects of the invention are fully attained by means of the aforesaid design.

In this respect, all the problems cited in the introduction are obviated in that the eight initial elements required for assembling different frames are identical, so that (for example) the mould preparation becomes insignificant.

Said mould will preferably be sized to obtain elements suitable for forming frames of relatively large dimensions, the elements then being shortened as required, to obtain frames of the required dimensions.

Finally, it should be noted that said shortening is effected at that end of said element distant from the end comprising the bent part of the element (or corner of the corresponding flat annular structure).

BRIEF DESCRIPTION OF THE DRAWINGS

The characteristics and constructional merits of the invention will be apparent from the detailed description given hereinafter, with reference to the accompanying figures, in which:

FIGS. 4A, 4B and 4C are schematic frontal views showing three differently sized shielding units obtained from a frame according to the invention.

DESCRIPTION OF THE PREFERRED EMBODIMENT

Figure 1:
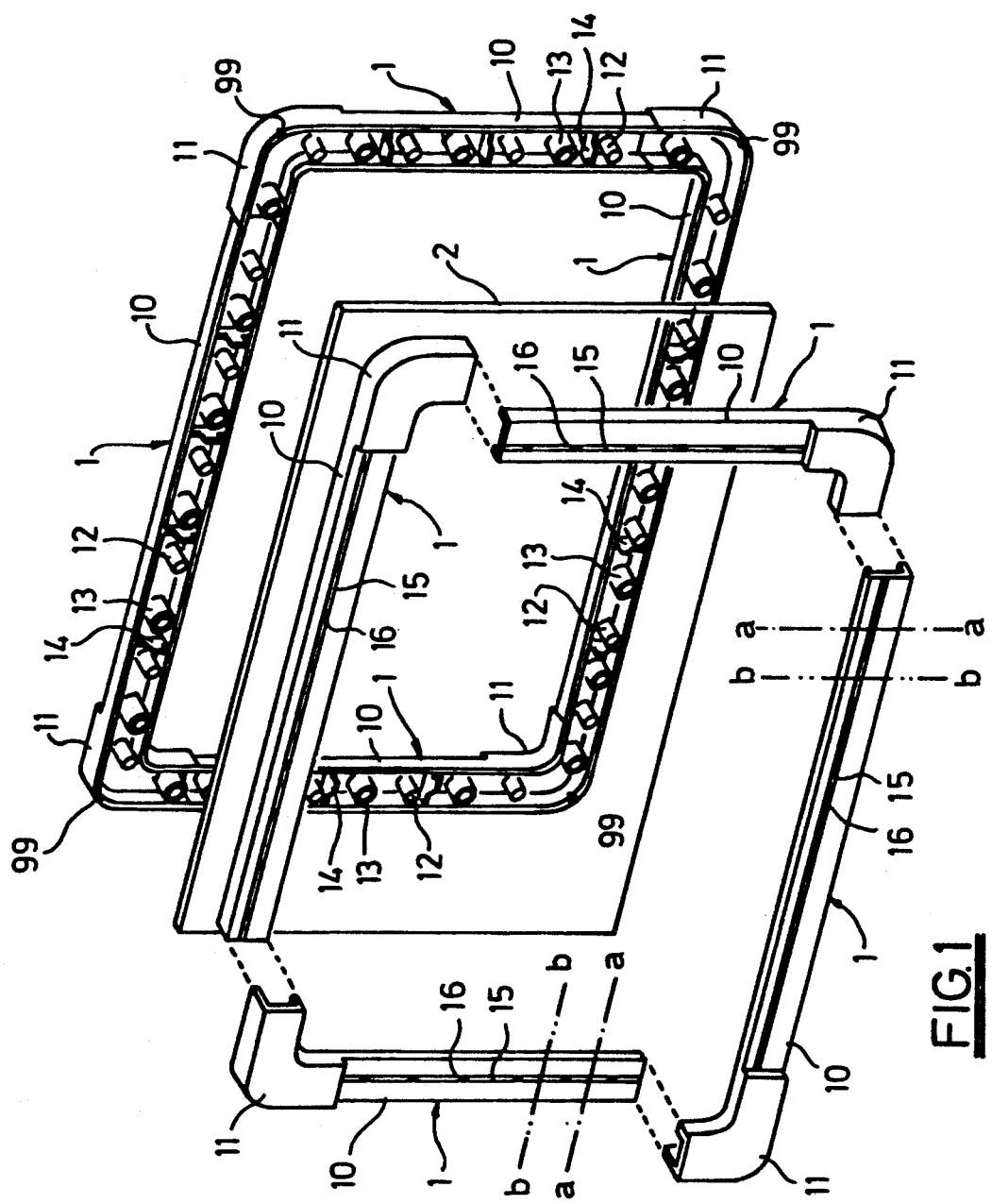
FIG. 1 is an exploded perspective view of the invention, in which the elements of one flat annular structure are coplanar, whereas the elements of the opposing flat annular structure are shown offset for greater clarity.

From said figures, and in particular from FIG. 1, it can be seen that the frame of the invention comprises two flat annular structures, each consisting of four consecutive elements 1 of elongate shape, which are constructed by moulding a convenient synthetic material.

At this point it should be noted that in FIG. 1 the two vertical elements 1 of each annular structure have a length less than that of the two corresponding horizontal elements 1 because said elements have already been cut to the size necessary to adapt them to the standard dimensions of a shielding plate 2 suitable for association with for example with a screen such as that indicated by 3 in FIG. 4A.

Figure 4C:
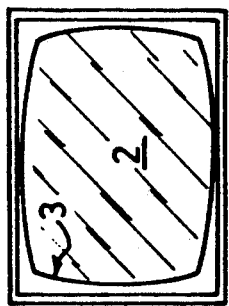
Figure 4B:
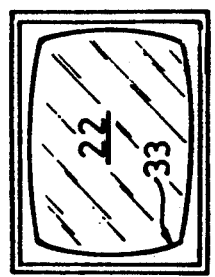
Figure 4C:
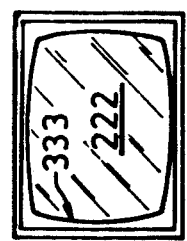

According to the invention the elements 1 are substantially identical in terms of shape and length when they are formed, and only afterwards are they cut to the size required, as can be seen in FIGS. 4B and 4C, which shows how the frame elements 1 of FIG. 4A can be adapted to the standard dimensions of a shielding plate 22 or 222 of size suitable for a screen 33 or 33 different from the screen 3 (FIG. 4A) previously mentioned.

Figure 2:
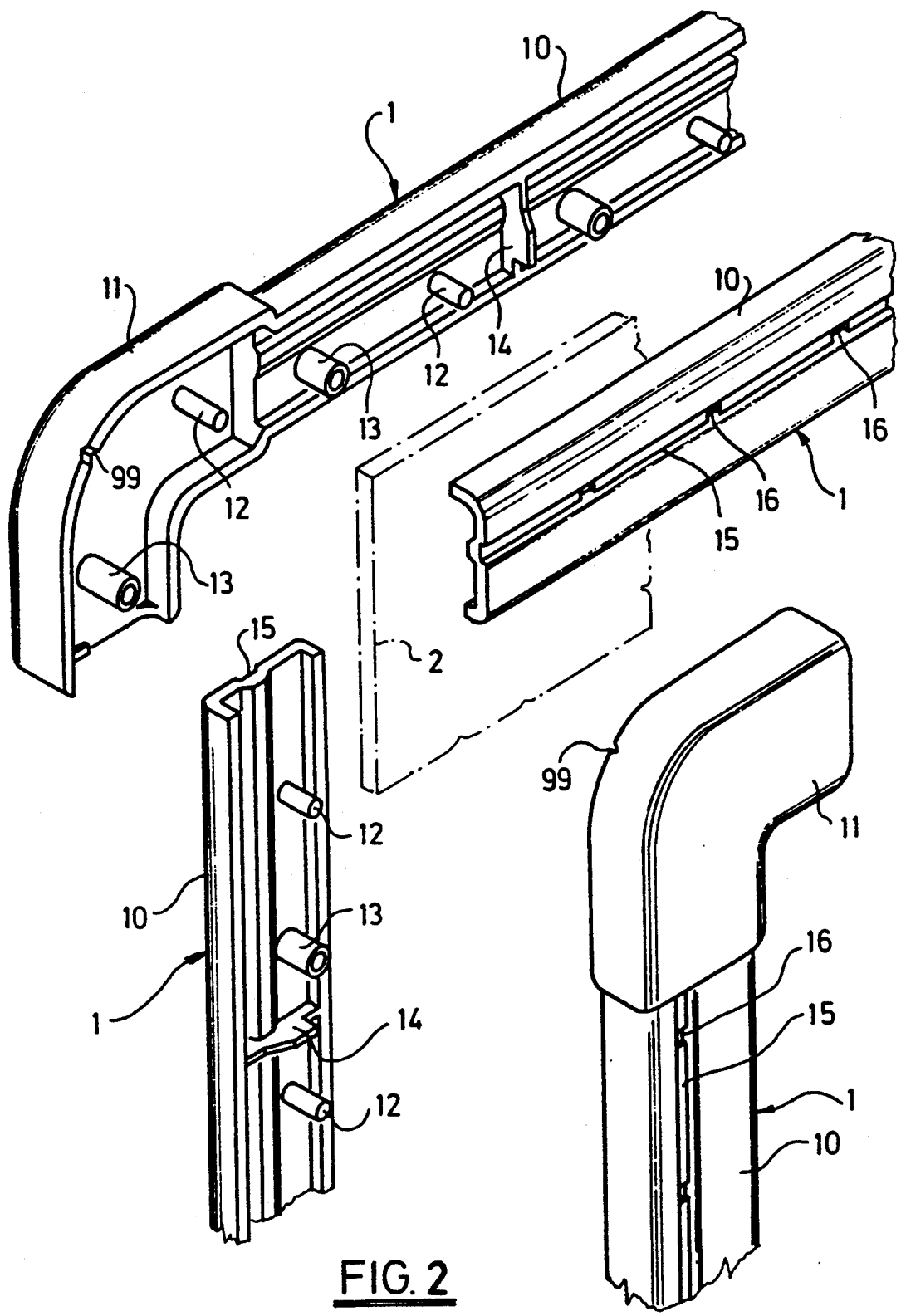
FIG. 2 is an exploded view to a greater scale, showing four elements used for forming an upper corner of the frame of the invention.

As shown in FIGS. 1 and 2, each element 1 comprises a straight portion 10 of right channel-shaped cross-section, and an end portion 11 bent to a right angle, and also with a right channel-shaped cross-section.

Each element 1 provides one side and one corner of the respective flat annular structure, the adaptation of each element 1 to the dimensions of a shielding plate 2, 22 or 222 being effected at that end of the element 1 distant from that comprising said right-angle bent end portion 11.

This is well illustrated in FIG. 1, in which the planes indicated by the dashed and dotted line a—a and by the dashed and double-dotted line b—b indicate two possible cutting regions of the elements 1.

For example, said cutting regions a—a, b—b etc. can be spaced apart by one inch (25.4 mm), in that the dimensions of the plates 2 (or 22 or 222) and screens 3 (or 33 or 333) normally differ one from the other by one inch or a multiple of one inch, throughout the respective series.

Again with reference to FIGS. 1 and 2, it can be seen that from the inner face of the base part of the channel associated with each element 1 there branch a series of equidistant pegs 12, a series of equidistant hollow cylindrical sockets 13, these latter alternating with the preceding, and a series of thin equidistant baffles 14. For example, the distribution pitch of said pegs 12 and sockets 13 can be between 40 and 50 mm, the baffles 14 being in any number and distribution.

In addition, on that side facing the frame interior, each baffle 14 comprises a step-shaped seat (see FIGS. 1 and 2) for the purpose of centering the shielding plate 2 (or 22 or 222).

Said pegs 12 and sockets 13 are snap-coupled during the assembly of the component elements 1 of the frame, the consistency of which is ensured by the fact that the abutting regions between the pairs of consecutive elements 1 of one annular structure are covered by the elements of the other annular structure.

This is clear from the accompanying FIGS. 1 and 2, from which it can also be seen that in the outer face of the base wall associated with the straight portion 10 of each element 1 there is provided a fully extending longitudinal groove 15.

In the base of said groove 15 there is provided a series of equidistant impressions 16.

Said grooves 15 and impressions 16 are provided for fixing to a device for suspending the shielding unit (frame plus plate) in front of the screen 3 (or 33 or 333) of an apparatus incorporating a video terminal (not shown).

Figure 3:
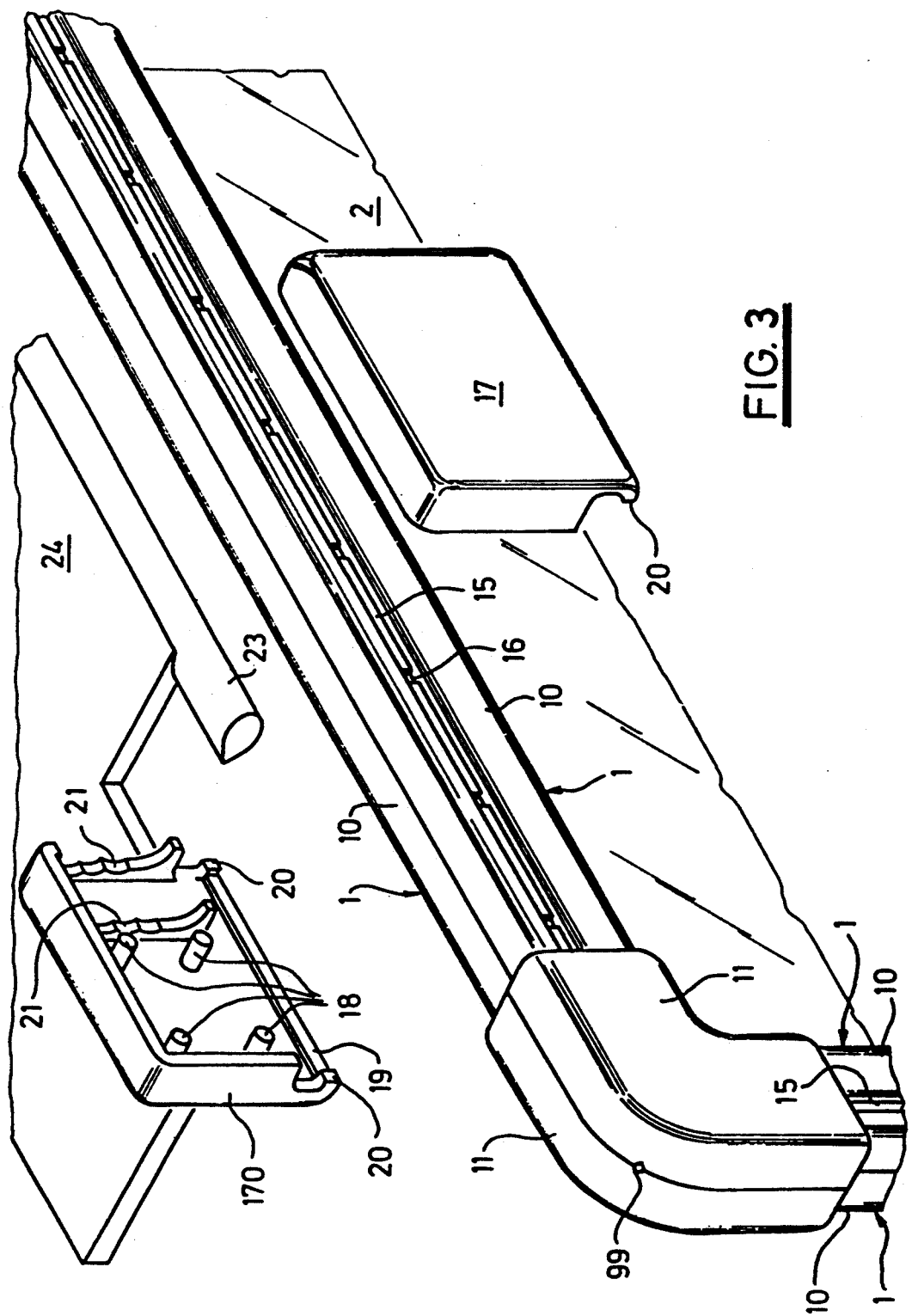
FIG. 3 shows the elements of FIG. 2 in their assembled state, together with a part of a suspension device or fixing the frame to the housing of a visual display unit.

Basically, said device comprises two box members, of which only one is shown in FIG. 3, and which each consist of two half-casings 17 and 170, of which one, 17, is provided with four hollow cylindrical sockets (not shown), and the other comprises four pegs 18 for snap-connection to said sockets.

In addition, each half-casing 17, 170 is lowerly provided with a rib 19 to engage with the corresponding groove 15 of the upper horizontal element 1 of the frame.

Said rib 19 comprises two end teeth 20 for insertion into a pair of adjacent impressions 16.

Said half-casings 17 and 170 are provided with facing toothed sectors 21 providing a fixing seat for a pin 23 of right oblong cross-section.

Said pin 23 is coaxial to a further identical pin (not shown), said two pins projecting from a plate 24 which is to be centrally fixed in known manner onto the upper face of the housing of a screen such as 3, 33 or 333.

The functions and characteristics of said suspension device or system are described in the initially cited application No. 34825 B/90, to which reference should be made for further details.

With regard to the sectional frame according to the invention, it is important that the two box members provided for the support/suspension of the frame be removably associated with this latter. so that the suspension device can be perfectly centered about the vertical axis of symmetry of the frame, whatever the degree of shortening to which the frame horizontal elements are subjected. Consequently the frame of the invention can in a certain sense be defined as of universal type, or in other works of high applicational versatility.

Finally, the reference numeral 99 (FIG. 2) indicates small notches provided in the curved portions 11 of the elements 1, their purpose being to provide small apertures through which a small cable (not shown) can be passed to connect the plate 2 (or 22 or 222) to earth in order to discharge the electrostatic charges.

The merits and advantages of the invention are apparent from the aforegoing and from an examination of the accompanying figures.

I claim:

1. A frame for assembling shielding units for the radiation emitted by apparatus incorporating variously sized video terminals
   comprising a flat annular front structure, a flat annular rear structure,
   said front structure and said rear structure each being made up of four separate identically configured elements,
   each said element being formed as one piece and having a straight portion and a corner portion,
   each said element also having fastening means formed thereon and spaced therealong to fasten said front structure to said rear structure,
   a shielding plate located between said front structure and said rear structure,
   said fastening means also serving to clamp an outer edge of said shielding plate in place between said front structure and said rear structure, and
   said fastening means on each element of either said front structure or said rear structure being engaged by said fastening means on two of said elements of the other of said front structure or said rear structure.

2. A frame for assembling shielding units for the radiation emitted by apparatus incorporating variously sized video terminals comprising
   a flat annular front structure,
   a flat annular rear structure,
   said front structure and said rear structure each being made up of four separate identically configured elements, each said element being formed as one piece and having a straight portion and a corner portion,
each said element also having fastening means formed thereon and spaced therealong to fasten said front structure to said rear structure,
a shielding plate located between said front structure and said rear structure,
said fastening means also serving to clamp an outer edge of said shielding plate in place between said front structure and said rear structure,
said fastening means on each element of either said front structure or said rear structure being engaged by said fastening means on two of said elements on the other of said front structure or said rear structure, and an outer face of said straight portion (10) of each said element (1) is provided with a longitudinal connection seat (15, 16) to which members (19, 20) providing means for supporting the frame in front of a screen (3) of said apparatus can be connected.

3. A frame as claimed in claim 2, wherein said longitudinal connection seat includes a groove and a series of equidistant impressions.

4. A frame as claimed in claim 1, wherein said fastening means includes pegs and sockets.

5. A frame as claimed in claim 4, wherein each of said elements also has formed thereon baffles, each of said baffles having a step-shaped seat for engaging and centering said shielding plate.

* * * * *